Oct. 23, 1956

S. M. THOMSEN 2,768,142

METHOD OF MAKING ANTIMONY ACTIVATED
MAGNESIUM SULFIDE PHOSPHOR
Filed March 30, 1951

INVENTOR
SOREN M. THOMSEN
BY
ATTORNEY

United States Patent Office 2,768,142
Patented Oct. 23, 1956

2,768,142
METHOD OF MAKING ANTIMONY ACTIVATED MAGNESIUM SULFIDE PHOSPHOR

Soren M. Thomsen, Pennington, N. J., assignor to Radio Corporation of America, a corporation of Delaware Application March 30, 1951, Serial No. 218,327

6 Claims. (Cl. 252—301.4)

This invention relates to an improved phosphor material and to improvements in the method of making the phosphor. More particularly, the invention relates to an improved antimony-activated magnesium sulfide phosphor and to an improved method of preparation of the luminescent material.

In one system of color television presently employed for televising films, a "flying-spot" cathode-ray tube is used to scan a film negative, the light transmitted through the negative then being divided into three color components, red, blue, and green. These components are then simultaneously transmitted.

The requirements for a phosphor to be used in a flying-spot cathode-ray tube are extremely fast decay, broad emission spectrum, and reasonably high efficiency. Previously, the phosphor which has been mainly used in the luminescent screen of this type of tube has been a hexagonal $ZnO:(Zn/S=)$. However, although this phosphor emits strongly enough in the green and blue regions of the visible spectrum, its emission in the red is lower than desired.

Because of the emission deficiency of the above-mentioned zinc oxide phosphor, a search was conducted for an improved phosphor which would have not only desirable short decay and high luminescence efficiency characteristics but broad band emission as well. A result of the search was the making of an improved magnesium sulfide phosphor activated with antimony.

One object of the present invention is to provide an improved phosphor material having both very short time decay characteristics and broad band emission.

Another object of the invention is to provide an improved phosphor material especially suitable for flying-spot cathode-ray tubes to be used in color television systems.

Another object of the invention is to provide an improved phosphor suitable for luminescent screen manufacture.

Still another object of the invention is to provide an improved method of preparing antimony-activated magnesium sulfide phosphor.

Figure 1:
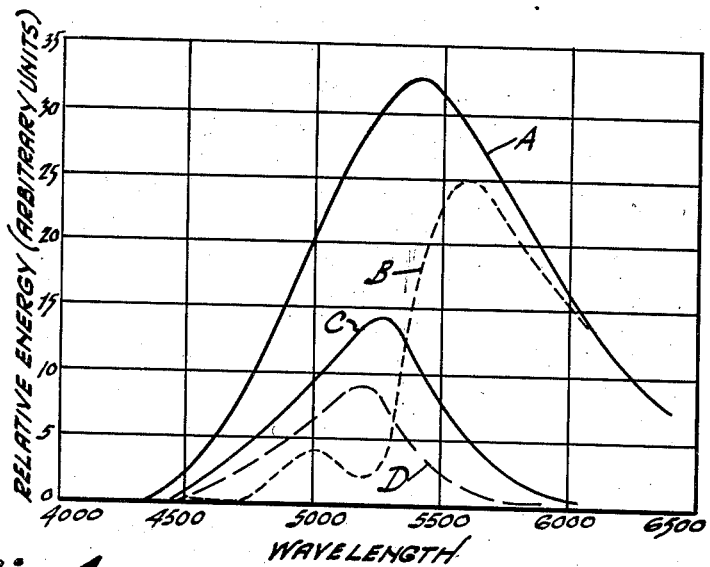
Figure 2:
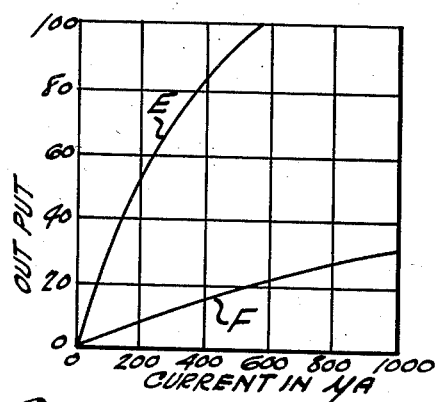

These and other objects will be more apparent and the invention will be more readily understood from the following description and the accompanying illustrative drawing, of which:

Figure 1 is a graph of luminescence emission v. wavelength for a phosphor prepared in accordance with the present invention, and Figure 2 is a graph having two curves comparing the red output of a phosphor of the present invention and of a $ZnO:(Zn/S=)$ phosphor of the prior art.

In general, the invention lies in the preparation of an improved phosphor comprising magnesium sulfide activated with antimony, in which the antimony is present as the sulfide and in an amount of about 0.001 to about 0.1% by weight calculated as antimony. The improved phosphor is obtained by using raw materials having a heavy metal content of less than 0.001% and also using small amounts of alkali to keep the antimony from becoming entirely volatilized.

*Example*

The preparation of a phosphor, in accordance with the present invention, having the composition MgS:Sb is preferably accomplished in two steps:

1. The preparation of a MgO–SbCl$_3$ mix, and
2. The firing step converting the MgO to MgS and producing the phosphor in a single operation.

A suitable procedure for preparing the MgO–SbCl$_3$ mix is as follows: 100 g. of C. P. MgO is moistened with enough C. P. methanol to yield a thick slurry, and 4 ml. of 1 M SbCl$_3$ solution in methanol; i. e., enough to supply 0.5 g. Sb, is added. This mixture is dried in an oven at 80° C. The dry cake is broken up into a powder.

The firing step is accomplished by placing the powdered mixture in a silica boat and firing for 1 hour at about 900° C. Firing takes place in an atmosphere provided by a flow of nitrogen gas saturated with carbon disulfide gas. Sulfur vapor or hydrogen sulfide gas could also be used and any other inert gas substituted for the nitrogen. The charge may be withdrawn to an unheated end of the furnace to cool for about 10 minutes, with the gas flow maintained, before being exposed to the air.

The firing temperature may be varied from about 700° C. to about 1200° C. Firing time should be at least 10 minutes and may be for about 2 hours. The heating temperature varies inversely with the heating time and the latter factor also depends upon the size of the sample. Time and temperature, in general, should be sufficient to permit the antimony to react thoroughly with the magnesium sulphide compound and for the MgO to be converted to MgS.

The product resulting from the above described process is a fine-particle, soft powder which is light yellow in color. It luminesces a bright yellow under either 3650 U. V. or cathode ray excitation. A typical group of emission curves for a sample of the phosphor is shown in Figure 1. Curve A is a curve of overall emission with no light filters used. Curve B is the relative emission measured, using a red filter, curve C is the relative emission through a green filter, and curve D is the relative emission through a blue filter. Curve A shows that the MgS:Sb phosphor has relatively high total emission energy and luminesces over a broad band of wavelengths. The other curves show the relative proportion of the luminescence in the red, green, and blue regions, respectively.

Figure 2 shows the red emission output of a phosphor prepared in accordance with the present invention, compared with the red emission of a typical zinc oxide phosphor. Curve E is for the MgS:Sb material; curve F is for the ZnO phosphor. The output in each case was measured as the luminescence resulting from cathode ray bombardment over the same range of current densities/square cm. It will be seen from a comparison of these two curves that the red output of the MgS:Sb material is much the greater of the two phosphors, at all current densities used.

Two critical factors have been found which must be carefully controlled if good results are to be obtained in preparing the materials of the present invention. The magnesium compound used should preferably contain less than about 0.001% by weight of heavy metals. By "heavy metals" is meant metals other than the alkali, alkaline earth, or the aluminum group metals found in groups 1, 2, or 3 of the periodic system. Since some magnesium oxides labeled "C. P." contain more than 10 times this amount of heavy metals, they must be carefully purified to reduce the heavy metal content to the amount specified, for good results. If heavy metal content is too high, say .01% by weight, brightness of luminescence of the product is greatly diminished. The other factor is the retention of sufficient antimony in the product. It has been found, unexpectedly, that appreciable amounts of alkali are required in the MgO starting material if sufficient antimony is to be retained.

With regard to the influence of alkali content on antimony retention, the desired results are preferably accomplished as follows: Sodium hydroxide may be added to the $MgO-SbCl_3$ mix. The best phosphors are prepared by using relatively small amounts of NaOH; i. e., about 0.1 to 0.4% by weight, and relatively large amounts of antimony; i. e., 0.1 to 0.5% by weight, relative to the amount retained in the product. Most of the antimony is volatilized but, under these conditions, enough is retained to produce good phosphors. When relatively larger amounts of NaOH; i. e., 0.4 to 1%, and relatively small amounts of antimony; i. e., 0.01 to 0.05% by weight, are used, results are less favorable. Instead of NaOH, any other fixed alkali may be used, for example, KOH or alkaline earth oxides.

In the course of the experiments which resulted in the present invention, other methods of retaining the antimony in the product were tried. One was converting the MgO to MgS without the presence of antimony, then adding the antimony and firing the mixture in a loosely closed silica thimble. Antimony concentrations used were 0.1 to 0.5%. In every case, although the antimony was retained, the products were gray in color and non-luminescent.

Another method tried was to use the less volatile $Sb_2O_3$ instead of $SbCl_3$ in the MgO-antimony compound mix. Instead of a luminescent material, a practically non-luminescent grayish material resulted.

The best obtainable MgS used as a starting material along with magnesium ammonium sulfide and antimony trichloride yielded only grayish materials very poor in luminescence.

Efforts were also made to introduce the antimony other than by mixing it with the MgO. A layer of $SbCl_3$ was placed in the bottom of the combustion boat and, in another trial, $SbCl_3$ was dissolved in the $CS_2$ through which the $N_2$ gas was passed. Neither of these efforts resulted in a good product.

The reasons for the specific nature of the preferred process for producing the MgS:Sb phosphor of the present invention are not entirely understood. It seems possible that the antimony reacts with the MgO and the $S^=$ to form a thioantimonate. It is not desired to be limited by this theory, however, since some other reaction mechanism may be present.

I claim as my invention:

1. A method of preparing an antimony-activated magnesium sulphide phosphor material comprising heating in a sulphur-containing atmosphere a mixture of MgO, sufficient $SbCl_3$ to furnish antimony in activator proportions, and about 0.1 to about 0.4% by weight of a fixed alkali selected from the class consisting of sodium hydroxide, potassium hydroxide and the oxides of the alkaline earth metals, until at least an activating portion of the antimony has reacted with the magnesium sulphide compound which results.

2. A method according to claim 1 in which the percentage by weight of Sb is about 0.1 to about 0.5, added as $SbCl_3$.

3. A method of preparing an antimony-activated magnesium sulphide phosphor material comprising heating in a sulphur-containing atmosphere a mixture of MgO, between about 0.1 and 0.5% by weight of Sb added as $SbCl_3$, and about 0.1 to 0.4% by weight of sodium hydroxide until at least an activating portion of the antimony has reacted with the magnesium sulphide compound that results.

4. A method of preparing an antimony-activated magnesium sulphide phosphor material comprising heating in a sulphur-containing atmosphere a mixture comprising predominantly MgO having a heavy metal content of less than about 0.001%, about 0.1 to about 0.5% by weight of Sb added as $SbCl_3$ and about 0.1 to 0.4% by weight of sodium hydroxide at a temperature of about 700° C. to about 1200° C. for at least 10 minutes.

5. A method according to claim 4 in which said sulfur-containing atmosphere is furnished by a stream of nitrogen gas saturated with carbon disulfide.

6. A method of preparing an antimony-activated magnesium sulphide phosphor material comprising heating in a sulphur-containing atmosphere a mixture comprising predominantly MgO having a heavy metal content of less than about 0.001%, about 0.1 to 0.4% by weight of potassium hydroxide at a temperature of about 700° C. to about 1200° C. for at least 10 minutes.

References Cited in the file of this patent

Leverenz: Luminescence of Solids. Publisher, John Wiley & Sons, Inc., Jan 12, 1950, pgs 64–65.